Jan. 23, 1934.   J. R. MADEIRA   1,944,357
FEEDING HEAD FOR RECIPROCATING OR JIGGING CONVEYERS
Filed Dec. 17, 1931   4 Sheets-Sheet 1
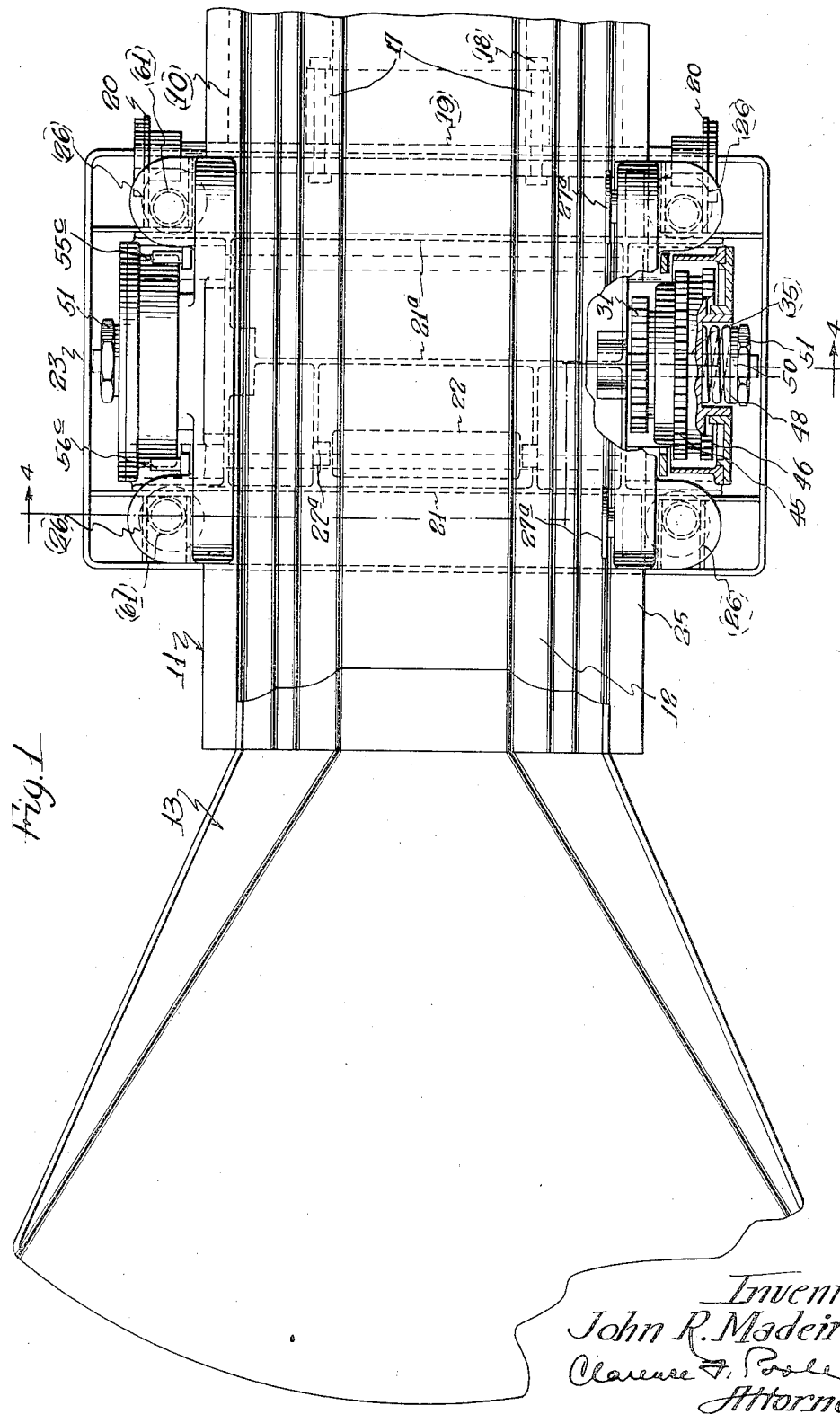

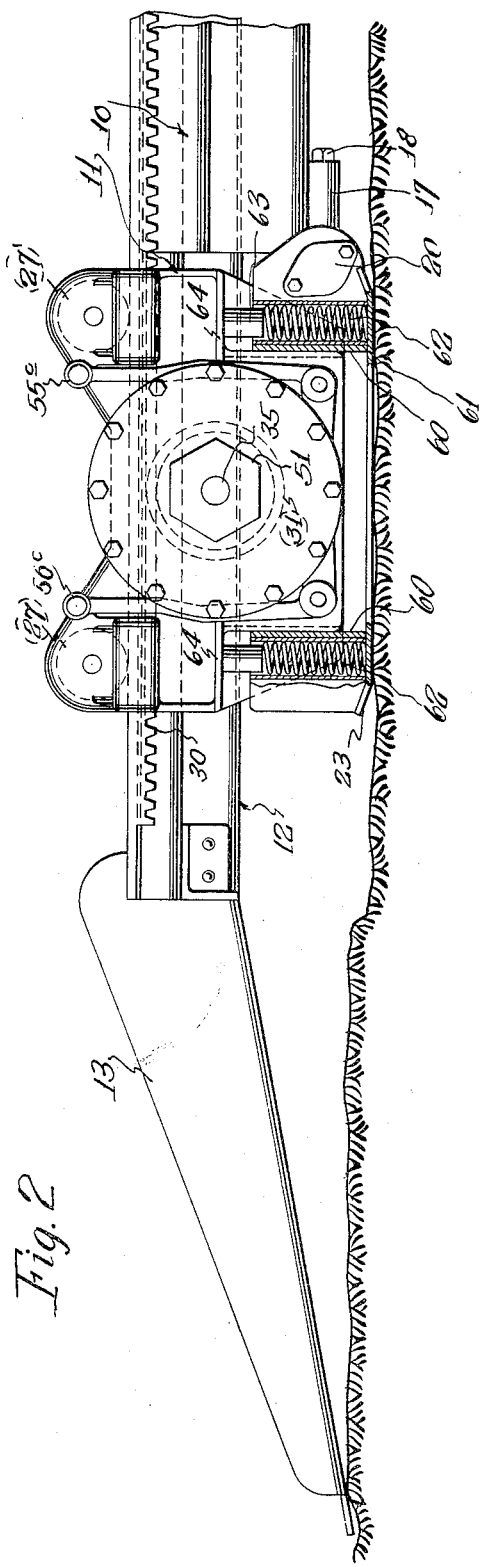

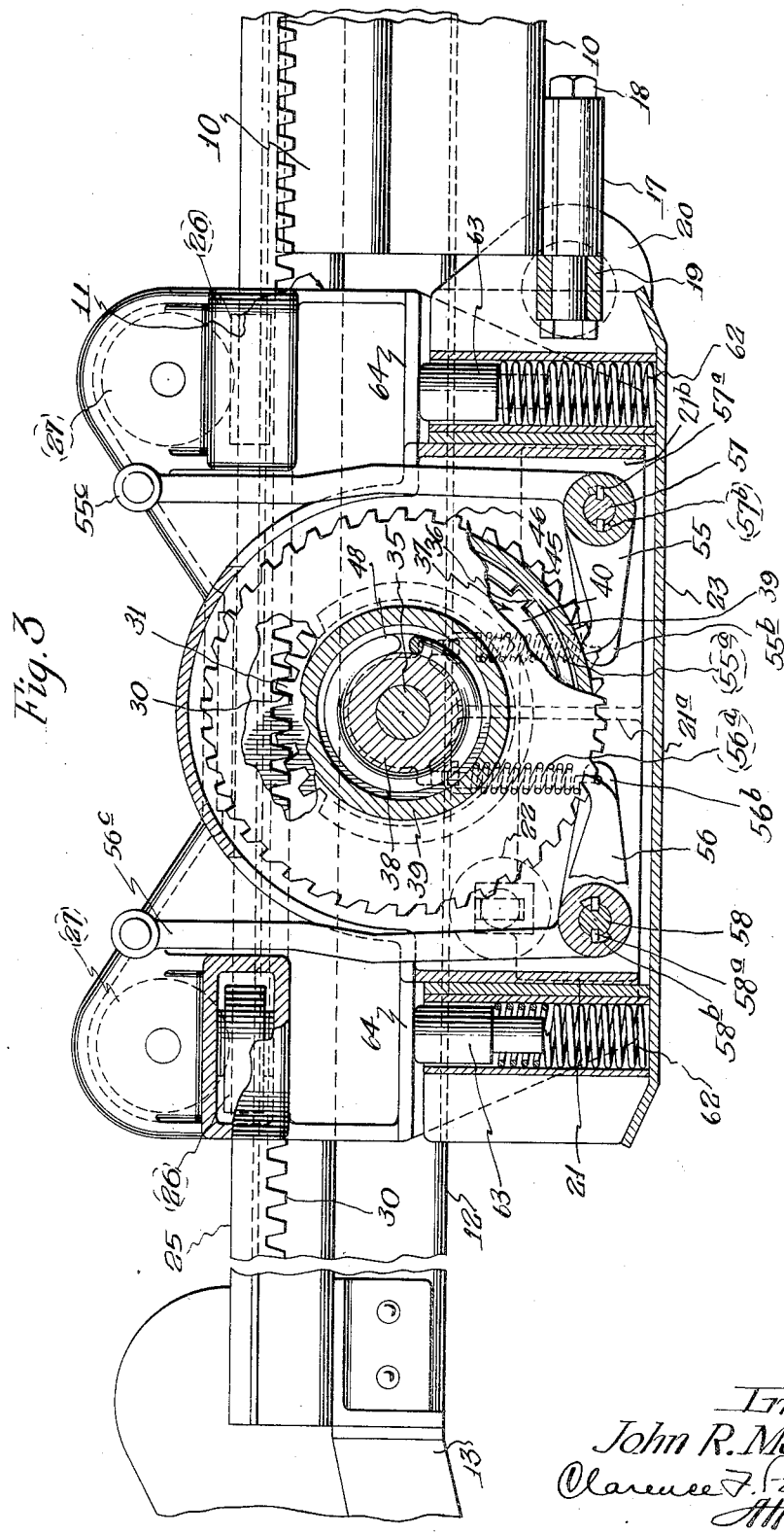

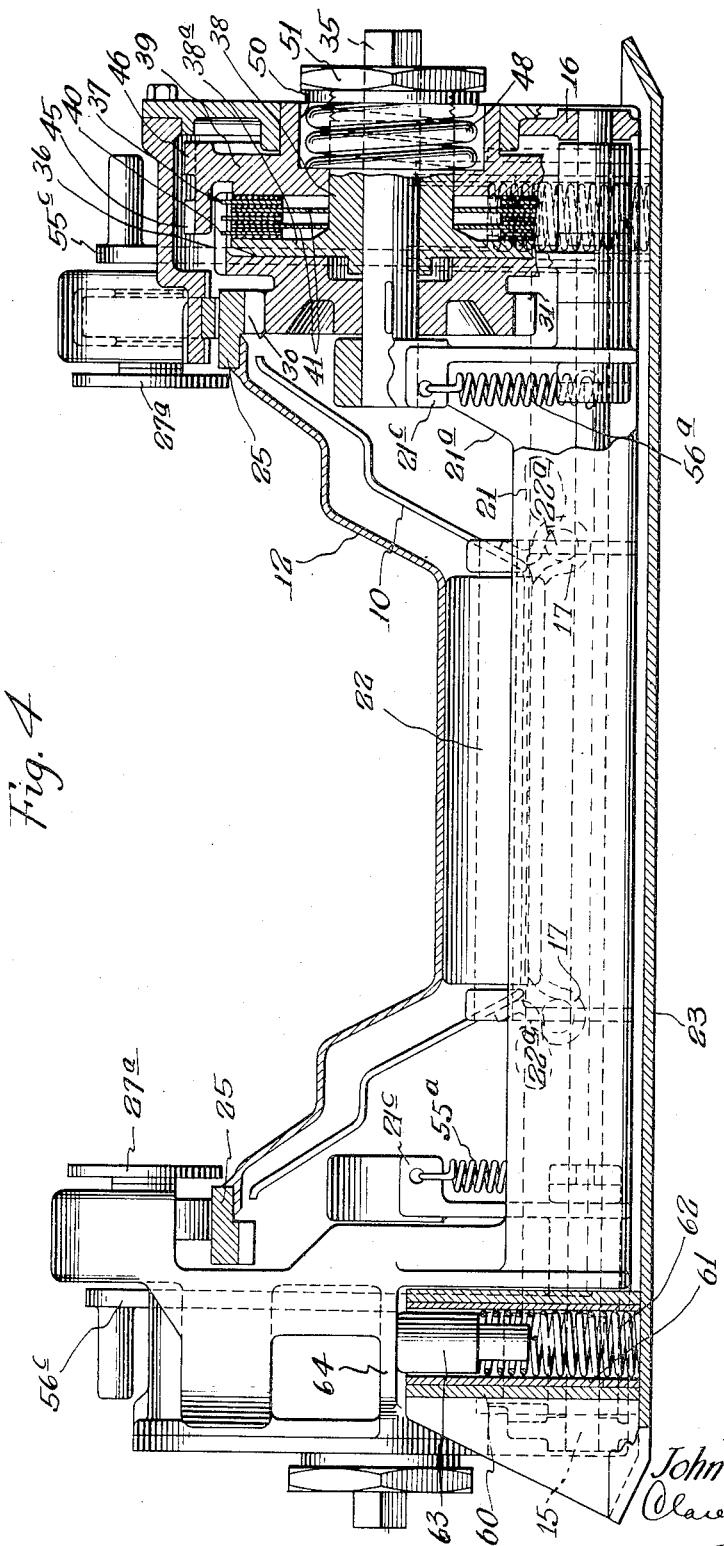

Patented Jan. 23, 1934

1,944,357

UNITED STATES PATENT OFFICE 1,944,357

FEEDING HEAD FOR RECIPROCATING OR JIGGING CONVEYERS

John R. Madeira, Chicago, Ill., assignor to Goodman Manufacturing Company, Chicago, Ill., a corporation of Illinois Application December 17, 1931
Serial No. 581,544

7 Claims. (Cl. 198—220)

This invention relates to improvements in feeding heads for reciprocating or jigging conveyers of the type used for gathering and transporting loose material such as coal, rock or the like.

More specifically my invention relates to improvements in construction of feeding heads attached to the loading end of reciprocating conveyers and which include manually operated means for controlling the extension or retraction of a telescoping trough section and gathering shovel at the loading end of the conveyer.

As heretofore constructed, the feeding head was attached to the conveyer proper and has been provided with friction devices which are engageable and disengageable with a telescoping trough section by manual operation, during such periods of the forward or rearward stroke of the conveyer as to cause the telescoping section with its shovel to be extended or retracted as required.

Manual controlling means for the friction devices have usually consisted of a lever or a system of levers arranged to shift said friction devices into engaging or disengaging position, such shifting movement requiring positive application of force to the friction clamping devices through the lever system. The proper manipulation of the control levers involves the exercises of considerable skill, and efficiency of operation is only obtained after considerable experience with machines of this character. Furthermore, the extensible trough and shovel are sometimes brought into engagement with fixed obstructions such as solid rock or the like, which abruptly stops the forward feeding or jigging action of the shovel and may, under certain conditions, throw the control levers in one direction or the other so as to injure the operator if he happens to have hold of the levers at that instant. Also, in the event that the friction devices are locked without sufficient slippage, the shock produced by meeting such an obstruction may be sufficient to break or bend a portion of the main conveyer through which the reciprocating or jigging action is produced.

In carrying out my invention I provide an improved form of movable connection between the loading head and the extensible trough section including the shovel, whereby relative movement of said trough section is automatically controlled, but said trough may at will be permitted to slide forwardly or rearwardly relative to said head under manual control of the operator but without requiring any positive effort excepting that necessary to engage or disengage a ratchet device. I also provide a slip friction connection between the control devices and the extensible trough arranged so that in the event the trough engages an obstruction the driving connection will yield so as to avoid injury to the operator or danger of breakage of the equipment, as will hereinafter more fully appear.

My improved form of driving connection and control means also affords an arrangement whereby either the feeding or retractive movements of the extensible trough will be produced automatically by the reciprocating or jigging action of the main conveyer without requiring the special skill of the operator in manipulation of the control levers in timed relation with the stroke of the main conveyer as has heretofore usually been required.

A further advantage of the invention is the provision of an improved form of yieldable supporting base for the loading head arranged so as to accommodate itself to variations in level and inclination of the mine floor over which the loading head and shovel are operated, thus increasing the efficiency of operation of the device, as will hereinafter more fully appear.

Other objects of my invention will appear from time to time as the following description proceeds.

The invention may best be understood by reference to the accompanying drawings wherein:

Figure 1 is a top plan view of the feeding head attached to the forward end of a reciprocating conveyer with a portion of the extensible trough and digging shovel in retracted position within said head and with portions broken away to show details of one of the friction clutch devices;

Figure 2 is a view in side elevation of the device shown in Figure 1 with portions of the flexible supporting base broken away to show the construction thereof;

Figure 3 is an enlarged detail view similar to Figure 2 but with parts of the clutch casing broken away to show the details of construction thereof; and Figure 4 is a transverse section taken on line 4—4 of Figure 1.

Referring now to details of construction of the embodiment of my invention illustrated in the drawings, the main elements thereof consist of a reciprocating trough section 10, a feeding head 11 and an extensible trough section 12, having a flared gathering shovel 13 integrally carried at its forward end in the usual manner.

The feeding head is suitably connected for reciprocating or jigging action with the main conveyer trough, preferably by means of a pivotal connection affording limited vertical rocking movement therebetween. In the form shown, the end of the main conveyer trough section 10 is provided on its under face with a pair of laterally spaced elongated eyes 17, 17 of the form usually employed in connecting adjacent trough sections together, but in the present instance the connecting bolts 18, 18 extend through a cross-bar 19 which is pivotally mounted at opposite ends in journaled supports 20 carried by side walls 15 and 16 of the loading head.

The side walls 15 and 16 are connected in spaced relation by transverse webs 21, 21a and 21b extending below the level of the extensible trough section 12 as clearly shown in Figure 4. A centrally disposed horizontal roller 22 is suitably mounted on brackets 22a, 22a between the side plates so as to support the center portion of said extensible trough. The entire framework including the side walls 15 and 16 and connecting webs 21, 21a and 21b together form a main frame which is bodily supported on a base plate 23, as will hereinafter more fully appear.

The extensible trough section 12 is partially nested above and within the forward end of the conveyer trough section 10 and is provided with laterally extending plates 25, 25 along each side thereof which are engaged by a plurality of horizontally disposed roller guides 26, 26 and vertically disposed roller guides 27, 27 mounted on the side walls 15 and 16 of the loading head.

Concentrically with each of the horizontally disposed roller guides 27, 27 and rotatable therewith are guide discs 27a, 27a which overhang the inner margins of the extensible trough plates 25, 25.

The undersurface of the extensible trough plates 25, 25 are formed with racks 30, 30 which engage pinions 31, 31 at opposite sides of the frame. The arrangement is such that the extensible trough section is supported in the loading head for longitudinal sliding movement relative to said loading head and the main conveyer section 10.

The pinions 31, 31, which engage the racks 30, 30 carried by each of the extensible trough plates 25, 25, are controlled by friction clutch means duplicated at opposite sides of the frame, a description of one of which will suffice for an understanding of both.

Each pinion 31 is rotatably mounted on a shaft 35 and is formed integrally with a housing 36 which forms one member of a friction clutch device indicated generally at 37. The other member of the friction clutch device comprises a sleeve 38 loosely mounted on the shaft 35 and an end plate 38a carried by said sleeve within the housing 36. A pressure plate 39 is mounted on the sleeve 38 and a series of friction discs 40, 40 are carried by the housing 36 in frictional engagement with a cooperating series of discs 41, 41 disposed between the end plate 38a and the pressure plate 39. In the form shown the discs 40 and 41 are made of metal with intermediate friction fabric mounted therebetween in the usual manner.

The pressure plate 39 has extending around its periphery two rows of ratchet teeth 45 and 46, which are cut in opposite directions to each other as clearly shown in Figure 3.

The degree of friction imposed upon the friction clutch is controlled by means of a coil spring 48 which surrounds the outer end of the sleeve 38 and engages in a recessed central portion 50 of the pressure plate 39. A nut 51 threaded on the end of the sleeve 38 provides means for adjusting the pressure on the spring 48.

Two pawls 55 and 56 are arranged to engage respectively the ratchet teeth 45 and 46 in opposite directions so as to form two overrunning clutch devices operable in opposite directions. These pawls are keyed on rocking shafts 57 and 58, respectively, which have bearing at their opposite ends in the side walls 15 and 16 and extend the full width of the main frame so as to connect the two corresponding sets of pawls which control the ratchet devices at the opposite side of the frame.

The pawls are normally maintained in locked engagement with their respective ratchet teeth by means of coil springs 55a and 56a connected between levers 55b and 56b, respectively, and a fixed part of the frame, which for convenience herein consists of a portion of a supporting journal 21c at the inner end of the shaft 35. Each pair of pawls 55, 55 at opposite sides of the frame are controlled simultaneously from either side of said frame by suitable trip levers 55c, each of said levers extending upwardly from opposite ends of the connecting shaft 57 into a position adjacent the top of the frame as clearly shown in the several figures. Similarly the pawls 56, 56 are controlled by trip levers 56c, 56c at opposite sides of the frame.

As will be seen in Figure 3, the pawls 55 and 56 are keyed to their respective shafts 57 and 58 by keys 57a and 58a respectively but these keys work in slots 57b and 58b which are elongated circumferentially of said pawls so as to permit the latter to be lifted over their respective ratchet teeth so as to avoid excessive rocking movement of the control levers 55c and 56c as the pawls ride the ratchet teeth at opposite sides of the frame.

The yieldable mounting of the upper framework carrying the control mechanism upon the base plate 23 will now be described. Said base plate extends beneath the entire feeding head so as to form a shoe upon which said head is slidably supported upon the mine floor. The main frame of the head, however, is yieldably supported on the base plate with vertically yielding springs at a plurality of points, as herein shown said springs being located adjacent the four corners of the base frame. Each of the yieldable supports comprises an upright cylinder 60 formed integrally with the base plate 23 having a lining tube 61 therein. A coil spring 62 is seated within the bottom of the tube 61 and a plunger 63 is supported on the top of said coil spring, said plunger projecting above the top of the cylinder and forming a support for a laterally projecting bracket 64 at each corner of the feeding head main frame.

With the arrangement above described, the feeding head has a floating and yieldable support upon the base plate 23. Sufficient clearance is also provided between the plunger 63 and the cylinder lining 61 so as to permit the main frame to tilt laterally relative to the base frame. The advantages of the yielding support just described will later appear from the following description of the use and operation of the entire device.

The use and operation of the device above described may now be set forth. It will be understood as previously explained, that the loading head is attached to the main conveyer 10, which conveyer is given a reciprocating or jigging action by suitable power device connected in the usual manner so as to tend to move the loose material along said main conveyer. The loading head, therefore, reciprocates bodily with the main conveyer and when the two sets of pawls 55 and 56 are in locked position the extensible trough 11 and shovel 12 will reciprocate also with the loading head and main conveyer. It will be understood further, however, that if the proper set of pawls is disengaged at a certain period in the cycle of jigging action of the feeding head, the extensible trough and shovel may be made to feed forwardly or rearwardly as desired.

For instance, one method of feeding the shovel forwardly relative to the feeding head is to release the lock between the extensible trough and the head at, or near, the point where the head itself is advanced to its furthermost position. The inertia of the extensible trough and shovel coupled with resistance to rearward movement of the shovel by loose material with which it may be engaged at the time, will tend to hold the shovel stationary while the feeding head and main conveyer are withdrawn rearwardly. The shovel and feeding head are then locked together at, or near, the rearward end of the stroke whereupon the next forward movement of the head will advance the shovel therewith into a newly extended position.

In the form of apparatus disclosed herein, this feeding movement just described can readily be accomplished by tripping the pawl 55 and holding it in unlocked position during the rearward stroke of the head. This will permit the pinions 31, engaged with the racks 30 on the side bars 25 of the extensible trough to rotate in a counter-clockwise position as viewed in Figure 3, and the inertia and resistance tending to hold the shovel and extensible trough stationary will permit the head to be moved rearwardly relative to the shovel during the rearward stroke of the head. During the next succeeding forward stroke of the head, the opposite pawl 56 will be in locking engagement with the pinion 31 thereby advancing the shovel forwardly to a new and extended position relative to the feeding head. Where only a partial extension or advance of the shovel is desired, the pawl 55 is tripped for but a portion of the rearward stroke.

The reverse or telescoping movement of the shovel is accomplished in a similar manner but by releasing the pawl 56 at the proper time; as, for instance, when the shovel and head start their forward stroke. The shovel will then be free to slide rearwardly relative to the head and resistance to the forward movement of the shovel is usually sufficient to accomplish this result.

Another method of extension or retraction of the shovel may also be employed which is particularly effected when there is little or no resistance to longitudinal movement of the shovel. This method consists in maintaining the parts in locked position until the end of the stroke in either direction and then quickly releasing the proper pawl so as to permit the shovel to continue its movement in the direction of the stroke through its own inertia. Although the feeding head reaches the end of the stroke and starts in the opposite direction, this latter method of advance or retraction is valuable mainly in changing the position of the shovel longitudinally of the head preparatory to, or after, the loading operation, but under ordinary loading conditions, of course, the first described method is generally employed as a more positive means of feeding.

With the main frame of the feeding head yieldably mounted on the base plate 23, as described, the effectiveness of operation of the feeding head is greatly increased under certain conditions as follows:

For instance, it has been demonstrated in practice that the forward feeding or loading action is best accomplished when the shovel is initially directed along the floor of the mine so as to quickly dig into the path of loose material, the resistance of which itself tends to hold the extensible trough section stationary relative to the reciprocating main conveyer during the retractive or rearward stroke of the latter. It will be observed that the reciprocating movement of the shovel 12 is to a large degree guided in a longitudinal path relative to the feeding head as shown in Figure 2. Therefore, if the forward end of the shovel should be engaged with a relative portion of the mine floor, as indicated in the figure, the yieldable support permits the feeding head frame to be lifted, or tilted, as the occasion demands and yet relieving the end of the shovel from a considerable weight of the feeding head which otherwise it might be called upon to carry. Similarly, when the floor of the mine tilts sidewise the base plate 23 is permitted to tilt in the same direction so as to conform itself readily therewith without interfering with its proper sliding movement along the mine floor.

Although I have herein shown and described one form in which may invention may be embodied, it will be understood that the construction and arrangement of the various parts may be altered or changed without departing from the spirit or scope of the invention. Furthermore, I do not wish to be construed as limiting myself to the particular embodiment illustrated, excepting as it may be limited in the appended claims.

I claim as my invention:

1. In combination with a feeding head for reciprocating conveyers, an extensible trough guided for horizontal movement relative to said head, a rotatable member on said head geared to said trough, ratchet means for restraining rotation of said rotatable member in one direction but permitting relatively unrestrained rotation in the opposite direction, friction means interposed between said rotatable member and said ratchet controlling means, releasable upon overload on said extensible trough, and manually operable means for rendering said ratchet means temporarily inoperable.

2. In combination with a feeding head for reciprocating conveyers, an extensible trough guided for horizontal movement relative to said head, a rotatable member on said head geared to said trough, two over-running clutch devices cooperating with said rotatable member in opposite directions, control means for selectively rendering said clutch devices temporarily inoperative and friction means interposed between said rotatable member and said over-running clutch devices, releasable upon overload on said extensible trough.

3. In combination with a feeding head for reciprocating conveyers, an extensible trough guided for horizontal movement relative to said head, a rotatable member on said head geared to said trough, ratchet means including a pair of oppositely disposed pawls operable to restrain rotation of said rotatable member in opposite directions and manually operable means for selectively moving said pawls out of operative position.

4. In combination with a feeding head for reciprocating conveyers, an extensible trough guided for horizontal movement relative to said head, a rotatable member on said head geared to said trough, an over-running clutch device for automatically restraining rotation of said rotatable member in one direction but permitting unrestrained rotation in the opposite direction, and manually operable means on said head for rendering said clutch device temporarily inoperative.

5. In combination, a loading head for reciprocating conveyers, an extensible trough, means for controlling horizontal movement of said trough, a base plate, and yieldable tension means interposed between said base plate and said loading head at a plurality of horizontally spaced points to support said head for lateral tilting movement relative to said base plate.

6. In combination, a loading head for reciprocating conveyers, an extensible loading trough guided for horizontal movement relative to said head, and means for controlling horizontal movement of the same, a base plate and yieldable tension means interposed between said base plate and said loading head at a plurality of horizontally spaced points to support said head for lateral tilting movement relative to said base plate and cooperating with said extensible trough to elevate said head when said trough is brought into partial supporting engagement with the mine floor.

7. In combination with a feeding head for reciprocating conveyers, an extensible trough guided for horizontal movement relative to said head, a rotatable member on each side of said head geared to said trough, each of said members having two over-running clutch devices operable in opposite directions of rotation of said rotatable member, and two manually operable control devices each connecting the two corresponding clutch devices on opposite sides of said head that operate in like direction for temporarily disengaging said corresponding clutch devices.

JOHN R. MADEIRA.